United States Patent [19]

Kabeta et al.

[11] Patent Number: 5,633,312
[45] Date of Patent: May 27, 1997

[54] PROCESS FOR PREPARING POLYORGANOSILANE

[75] Inventors: Keiji Kabeta; Sigeru Wakamatsu; Takafumi Imai, all of Tokyo, Japan

[73] Assignee: Toshiba Silicone Co., Ltd., Tokyo, Japan

[21] Appl. No.: 625,093

[22] Filed: Apr. 1, 1996

Related U.S. Application Data

[63] Continuation of Ser. No. 394,509, Feb. 27, 1995, abandoned.

[30] Foreign Application Priority Data

Feb. 28, 1994 [JP] Japan .................................. 6-029306
Aug. 5, 1994 [JP] Japan .................................. 6-184834

[51] Int. Cl.$^6$ .................................................. C08G 77/06
[52] U.S. Cl. ......................... 528/14; 528/33; 556/430; 556/469; 556/478
[58] Field of Search ..................... 528/14, 33; 556/430, 556/469, 478

[56] References Cited

U.S. PATENT DOCUMENTS

| | | | |
|---|---|---|---|
| 4,667,046 | 5/1987 | Frey et al. | 556/430 |
| 4,952,658 | 8/1990 | Kalchauer et al. | 528/33 |
| 5,489,662 | 2/1996 | Wakamatsu et al. | 528/14 |

*Primary Examiner*—Melvyn I. Marquis
*Attorney, Agent, or Firm*—Foley & Lardner

[57] ABSTRACT

Disclosed is a process for preparing a polyorganosilane which comprises subjecting a disilane compound having at least two substituted or unsubstituted hydrocarbyloxy groups in one molecule to disproportionation reaction in the presence of a catalyst comprising a reaction product of an organic alkali metal compound represented by the formula (I):

$$RM \qquad (I)$$

wherein R represents a substituted or unsubstituted monovalent hydrocarbon group; and M represents an alkali metal, represented by the formula (III):

$$MR^3_pM \qquad (III)$$

wherein $R^3$ represents a saturated or unsaturated chain or cyclic divalent hydrocarbon group or a divalent heterocyclic group, two or more $R^3$s may be the same or different and an ether oxygen atom may exist between two or more $R^3$s; p represents an integer of 1 or more; and M represents an alkali metal atom, and at least one of a disilane compound and a silane compound both of which have a substituted or unsubstituted hydrocarbyloxy group(s).

14 Claims, 1 Drawing Sheet

PROCESS FOR PREPARING POLYORGANOSILANE

This application is a continuation of application Ser. No. 08/394,509, filed Feb. 27, 1995, abandoned.

BACKGROUND OF THE INVENTION

This invention relates to a process for preparing a polyorganosilane or a silicon-containing polymer, more specifically to a process for preparing a polyorganosilane, in which a polyorganosilane can be prepared with good efficiency, its molecular weight can be controlled easily and optional various organic groups can be introduced into a polyorganosilane easily.

It has been known that a polyorganosilane is useful as an organic conductive material, a non-linear optical material, a photolysis type reaction initiator, a silicon carbide precursor and a photoresist material (e.g., Miller, R. D.; Michl, J., Chem. Rev., 89, 1359 (1989)). As a process for preparing a polyorganosilane, the Wurtz method using an organohalosilane or an organohalodisilane as a starting compound has been used widely. However, the Wurtz method has drawbacks that danger is incurred because metallic sodium or metallic potassium having self-ignition property in the air is used; reaction conditions are severe; it is difficult to control a molecular weight so that a polymer having a bimodal molecular weight distribution is produced; and it is difficult to introduce substituents other than an alkyl group and an aryl group.

Some attempts have been made to solve the above drawbacks. For example, there have been obtained by Nagai et al. cyclic dodecamethylcyclohexasilane and $\alpha,\omega$-dialkoxydisilane having a low molecular weight by disproportionation reaction of 1,2-dialkoxytetramethyldisilanes in the presence of sodium alkoxide without using metallic sodium nor metallic potassium (Japanese Provisional Patent Publications No. 24874/1979 and No. 146790/1982). There have been also reported syntheses of a high molecular weight polysilane by using disproportionation reaction of a disilane having an alkoxy group in the presence of sodium alkoxide as described above (Japanese Provisional Patent Publications No. 59183/1993 (which corresponds to U.S. Pat. No. 5,023,307) and No. 59184/1993 (which corresponds to U.S. Pat. No. 5,025,075), Japanese Chemical Society, 61st Spring Meeting: IG328, IG329 (1991), H. Watanabe et al., J. Mater. Chem., 1,483 (1991) and Japanese Provisional Patent Publication No. 311727/1992).

In these reactions, an alkali metal hydrocarbyloxide synthesized from an alcohol or a phenol and an alkali metal such as sodium or synthesized from an alcohol or a phenol and an organic alkali metal reagent such as butyl lithium is generally used as a reaction catalyst. The reactions are achieved by adding a previously isolated solid alkali metal hydrocarbyloxide as a catalyst or by a catalyst previously prepared in a flask in which disproportionation reaction is carried out. However, synthesis of such a common alkali metal hydrocarbyloxide is complicated and should be carried out with care.

That is, in general, when an alkali metal hydrocarbyloxide is synthesized, an excessive amount of the above alcohol or phenol is used in many cases and, if necessary, an organic solvent is further used. In order to obtain a polysilane by subjecting a disilane to disproportionation reaction, it is necessary to completely remove the alcohol or phenol used in an excessive amount and the organic solvent used, if necessary. Further, a solid alkali metal hydrocarbyloxide is obtained by removing the alcohol or phenol and low boiling point compounds such as the organic solvent so that the solid alkali metal hydrocarbyloxide is required to be dissolved in the disilane for carrying out disproportionation reaction. However, solubility of the alkali metal hydrocarbyloxide which becomes solid once is not always good so that a time for resolving it is required in some cases. Further, the alkali metal hydrocarbyloxide after removing a solvent therefrom is easily changed in quality during storage for a long period of time. When it is changed in quality, solubility is further lowered so that a catalyst activity to disproportionation reaction is lowered greatly. Thus, handling in the case of using the alkali metal hydrocarbyloxide as a catalyst of disproportionation reaction is complicated.

Further, various methods of obtaining an organic silicon polymer having a polysilane chain have been attempted. For example, there has been obtained by Kashizaki et al. a polymer having a potysilane chain which is soluble in an organic solvent, by subjecting diorganodichlorosilane and $\alpha,\alpha'$-dichloroxylene to the Wurtz reaction simultaneously (Japanese Provisional Patent Publication No. 139216/1992). Also, there has been obtained by Asuke et al. a silicon-containing polymer in which a benzene ring is introduced into a main chain by reacting diorganodichlorosilane and dilithiobenzene at a ratio of 1:1 (Japanese Provisional Patent Publication No. 342726/1992).

On the other hand, there has been obtained by Shono et al. a silicon polymer having an organic group and a weight average molecular weight of about 5,000 to 18,000 in which an atom or atoms other than silicon is/are introduced into a main chain, by carrying out an electrode reaction using a bis(halosilyl) compound as a starting compound (Japanese Provisional Patent Publication No. 348128/1992). There has been obtained by Ishikawa et al. a polymer having conductivity in which a thienyl group is introduced into a main chain, by polymerizing a bis(5-halomagnesiumthienyl) silane derivative by a nickel catalyst (Japanese Provisional Patent Publication No. 218533/1992). Further, there has been obtained by Ishikawa et al. a polymer in which ethynylene is introduced into a main chain, by subjecting a cyclic silane derivative containing ethynylene to ring-opening polymerization ("Organometallics" 1992, 11, 1604 to 1618). There has been obtained by Yamashita et al. a silicon-containing polymer in which a quinone is inserted into a Si—Si bond, by reacting a disilanylene polymer and a quinone ("Macromolecules" 1993, 26, 2143 to 2144).

The disproportionation reactions using alkoxydisilane compounds as described above are excellent in the point that the reaction can be carried out under mild conditions without using metallic sodium nor metallic potassium. Heretofore, several straight silicon-containing polymers have been obtained. However, when application to a non-linear optical material and a photoresist, particularly a conductive material is taken into consideration by making a molecular skeleton have a branched or network structure, an energy band gap between HOMO and LUMO of a polymer is narrowed to heighten utilizability as a conductive material. Also, by heightening a three dimensional element of the structure, heat resistance of the polymer itself can be improved. When such application is taken into consideration, it has been demanded to synthesize various silicon-containing polymers having a branched or network structure and mainly comprising a polysilane bond easily.

It might be possible to obtain various silicon-containing polymers as described above by carrying out a reaction by introducing desired organic groups into a starting silane derivative as carried out by Ishikawa et al. described above.

However, When such a silane derivative is obtained, there are problems that it is difficult to carry out a reaction in which organic groups are selectively introduced into the silane derivative and it is difficult to purify the resulting silane derivative. Further, in the reactions of Asuke et al. and Kashizaki et al. large amounts of metallic lithium and sodium should be used so that the reactions cannot be used for industrial mass production.

On the other hand, a chlorosilane compound having various organic groups is easily available, but there has not been known a method of obtaining a silicon-containing polymer having a branched or network structure and mainly comprising a Si—Si bond as described above from the chlorosilane compound safely and easily.

It has been known that in a silicon-containing polymer mainly comprising a Si—Si bond, its average molecular weight determines physical properties and characteristics of the silicon-containing polymer, and its control is extremely important. Particularly when good film-forming property is to be imparted, it is necessary to control its average molecular weight to 1,000 or more and also in such a range that said polymer has a solubility enough to prepare a 0.1 to 50% by weight, preferably 5 to 40% by weight solution. Therefore, there has been demanded a method of controlling the average molecular weight of such a silicon-containing polymer easily.

Also, organic groups bonded to a silicon atom of the silicon-containing polymer determine physical properties and characteristics of the polymer so that selection of the organic groups is important. Therefore, there has been demanded a method of introducing selected various substituents to such a silicon-containing polymer easily.

There has been obtained by Watanabe et al. a white powdery polysilane which has a methoxy group and is insoluble in toluene, by disproportionation reaction of 1,2-dimethyl-1,1,2,2-tetramethoxydisilane by using n-butyl lithium as a catalyst (see Japanese Chemical Society, 61st Spring Meeting: IG328, IG329 (1991)). However, there has not been described preparation of a catalyst further suitable for disproportionation based on such an organic alkali metal compound and also there have not been disclosed control of the average molecular weight of a polysilane and introduction of various organic groups demanded as described above, using such a catalyst.

SUMMARY OF THE INVENTION

An object of the present invention is to provide a process for preparing a polyorganosilane efficiently without using a catalyst such as an alkali metal hydrocarbyloxide which is difficult to handle alone. Another object of the present invention is to provide a process for preparing a polyorganosilane, in which the molecular weight of the resulting polyorganosilane can be controlled. Still another object of the present invention is to provide a process for preparing a polyorganosilane, in which various organic groups can be introduced to a polyorganosilane easily.

A further object of the present invention is to provide a process for preparing a silicon-containing polymer having a branched or network structure and various organic groups introduced thereinto, which is useful as the materials described above, from a disilane and an organic alkali metal compound both of which are easily available, in one pot simply and easily.

The present inventors have studied intensively in order to achieve the above objects and consequently found that a catalyst for disproportionation reaction having high activity can be obtained by reacting an organic alkali metal compound and a disilane compound and/or a silane compound both of which have substituted or unsubstituted hydrocarbyloxy groups; the molecular weight of the resulting polysilane can be controlled by selecting a volume ratio of the organic alkali metal compound used to the substituted or unsubstituted hydrocarbyloxy groups of the disilane compound used for disproportionation reaction; and optional various organic groups can be introduced to the polysilane by optionally selecting organic groups of the organic alkali metal compound, to accomplish the present invention.

That is, the process for preparing a polyorganosilane of the present invention (first embodiment) is a process which comprises subjecting a disilane compound having at least two substituted or unsubstituted hydrocarbyloxy groups in one molecule to disproportionation reaction in the presence of a catalyst comprising a reaction product of an organic alkali metal compound represented by the formula (I):

RM (I)

wherein R represents a substituted or unsubstituted monovalent hydrocarbon group; and M represents an alkali metal, and at least one of a disilane compound and a silane compound both of which have a substituted or unsubstituted hydrocarbyloxy group(s).

In another (second) embodiment of the present invention, a process for preparing a silicon-containing polymer having a branched or network structure comprises the steps of:

(1) reacting a disilane compound (A) having hydrocarbyloxy groups represented by the formula (II):

$R^1_n Si_2(OR^2)_{6-n}$ (II)

wherein $R^1$ and $R^2$ are the same or different and each independently represent a substituted or unsubstituted monovalent hydrocarbon group; and n represents an integer of 0 to 3, with an organic alkali metal compound (B) represented by the formula (III):

$MR^3_p M$ (III)

wherein $R^3$ represents a saturated or unsaturated chain or cyclic divalent hydrocarbon group or a divalent heterocyclic group, two or more $R^3$s may be the same or different and an ether oxygen atom may exist between two or more $R^3$s; p represents an integer of 1 or more; and M represents an alkali metal atom, to synthesize a bis(disilyl) compound (C) having a hydrocarbyloxy group(s) represented by the formula (IV):

$(R^2O)_{5-n} R^1_n Si_2 R^3_p Si_2 R^1_n (OR^2)_{5-n}$ (IV)

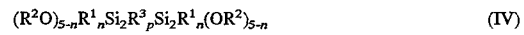

wherein $R^1$, $R^2$, $R^3$, n and p have the same meanings as described above, and an alkali metal hydrocarbyloxide (D) represented by the formula (V):

$MOR^2$ (V)

wherein $R^2$ and M have the same meanings as described above, from a part of the compound (A); and (2) subjecting the compound (C) in the resulting mixture and the remaining compound (A) to disproportionation reaction.

DESCRIPTION OF THE PREFERRED EMBODIMENTS

Figure 1:
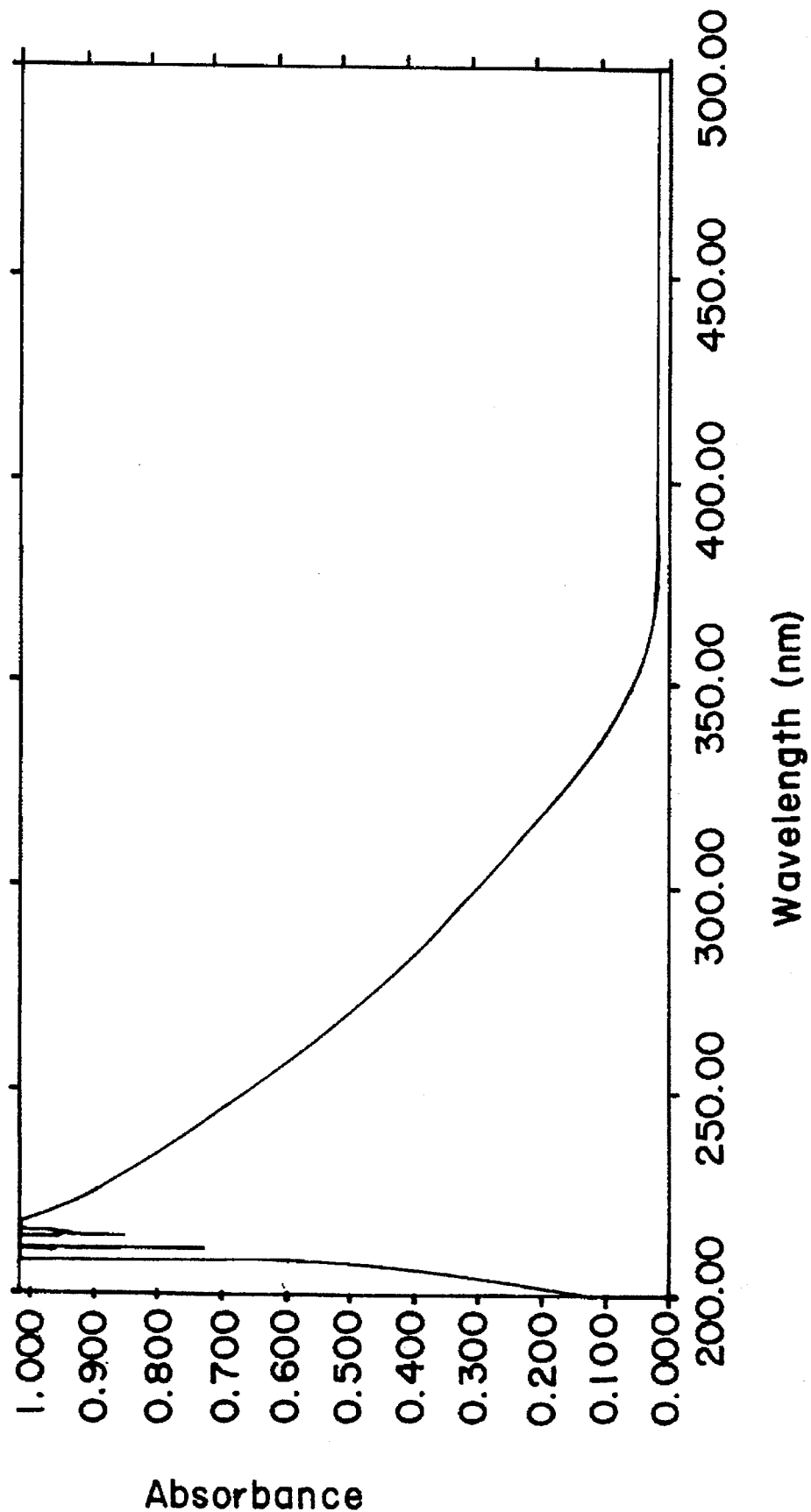
FIGURE 1 shows a UV absorption spectrum of a solution of a polyorganosilane obtained in Example 1.

In the following, the present invention is explained in detail.

In the present invention, the disilane compound to be used as a starting compound for the disproportionation reaction of both of the first and the second embodiments is represented by the formula (II):

$$R^1{}_n Si_2(OR^2)_{6-n} \qquad (II)$$

wherein $R^1$ and $R^2$ are the same or different and each represent a substituted or unsubstituted monovalent hydrocarbon group; and n represents an integer of 0 to 4.

As the substituted or unsubstituted monovalent hydrocarbon group represented by $R^1$ bonded to a silicon atom, there may be mentioned, for example, a straight or branched alkyl group having 1 to 20 carbon atoms such as methyl, ethyl, propyl, butyl, hexyl, octyl, decyl, dodecyl and octadecyl; a cycloalkyl group having 3 to 14 carbon atoms such as cyclohexyl; an aralkyl group such as 2-phenylethyl, 2-phenylpropyl and 3-phenylpropyl; an aryl group such as phenyl, tolyl and mesityl; an alkenyl group such as vinyl and allyl; an alkenylaryl group such as 4-vinylphenyl and p-(2-propenyl)phenyl; an arylalkenyl group such as styryl; a halogenated hydrocarbon group having 1 to 20 carbon atoms such as 3-chloropropyl, 4-chlorophenyl and 3,3,3-trifluoropropyl; and further hydrocarbon groups substituted by various substituents, such as 3-imidazolylpropyl, 3-carbazolylpropyl and 4-methoxyphenyl. These groups may be the same or different from each other. Particularly preferred is a methyl group because of easiness of synthesis and particularly from the points that the disilane compound can be obtained easily by alkoxylation (hereinafter including substituted alkoxylation) or phenoxylation of a methylchlorodisilane which is a by-product obtained when a chlorosilane is synthesized from metallic silicon and methyl chloride in the presence of a copper catalyst; and the disilane compound has a relatively low boiling point so that it can be handled easily.

$R^2$ is a substituted or unsubstituted monovalent hydrocarbon group constituting the substituted or unsubstituted hydrocarbyloxy group which is a silicon functional group and may include an alkyl group having 1 to 6 carbon atoms such as methyl, ethyl, n-propyl, isopropyl, n-butyl and t-butyl; a cycloalkyl group having 3 to 6 carbon atoms such as cyclohexyl; an aryl group such as phenyl and tolyl; an alkenyl group having 2 to 6 carbon atoms such as allyl; and a substituted hydrocarbon group such as 2-methoxyethyl, 2-ethoxyethyl and 2-butoxyethyl. From the points of easiness of synthesis and reactivity, a lower alkyl group such as methyl, ethyl, n-propyl and isopropyl and a phenyl group are preferred, and a methyl group or an ethyl group is more preferred The number of hydrocarbyloxy groups in the disilane compound (II) is selected depending on the molecular structure and molecular weight of a desired silicon-containing polymer. In the present invention, by using the disilane compound of the formula (II) in which n is 0 to 4, i.e., a disilane compound having two or more hydrocarbyloxy groups in a molecule, a silicone-containing polymer having a branched or network polysilane structure can be obtained. Also, if necessary, by using two or more disilane compounds as starting compounds in any desired combination, a silicon-containing polymer having various organic groups can be obtained.

As a specific example of the disilane compound described above, there may be mentioned a 1,2-dimethoxydisilane compound such as 1,1,2,2-tetramethyl-1,2-dimethoxydisilane, 1,1,2,2-tetraethyl-1,2-dimethoxydisilane, 1,1,2,2-tetraphenyl-1,2-dimethoxydisilane and 1,1-dimethyl-2,2-diphenyl-1,2-dimethoxydisilane; a 1,1-dimethoxydisilane compound such as 1,1,1,2-tetramethyl-2,2-dimethoxydisilane, 1,1,1-trimethyl-2-phenyl-2,2-dimethoxydisilane, 1,1,2-trimethyl-1-phenyl-2,2-dimethoxydisilane, 1,1-dimethyl-1,2-diphenyl-2,2-dimethoxydisilane, 1,2-dimethyl-1,1-diphenyl-2,2-dimethoxydisilane, 1-methyl-1,1,2-triphenyl-2,2-dimethoxydisilane, 2-methyl-1,1,1-triphenyl-2,2-dimethoxydisilane and 1,1,1,2-tetraphenyl-2,2-dimethoxydisilane; a 1,1,2-trimethoxydisilane compound such as 1,1,2-trimethyl-1,2,2-trimethoxydisilane, 1,1-dimethyl-2-phenyl-1,2,2-trimethoxydisilane, 1,2-dimethyl-1-phenyl-1,2,2-trimethoxydisilane, 1-methyl-1,2-diphenyl-1,2,2-trimethoxydisilane, 2-methyl-1,1-diphenyl-1,2,2-trimethoxydisilane and 1,1,2-triphenyl-1,2,2-trimethoxydisilane; a 1,1,1-trimethoxydisilane compound such as 1,1,1-trimethyl-2,2,2-trimethoxydisilane, 1,1-dimethyl-1-phenyl-2,2,2-trimethoxydisilane, 1-methyl-1,1-diphenyl-2,2,2-trimethoxydisilane and 1,1,1-triphenyl-2,2,2-trimethoxydisilane; a 1,1,2,2-tetramethoxydisilane compound such as 1,2-dimethyl-1,1,2,2-tetramethoxydisilane, 1-methyl-2-phenyl-1,1,2,2-tetramethoxydisilane and 1,2-diphenyl-1,1,2,2-tetramethoxydisilane; a 1,1,1,2-tetramethoxydisilane compound such as 1,1-dimethyl-1,2,2,2-tetramethoxydisilane, 1-methyl-1-phenyl-1,2,2,2-tetramethoxydisilane and 1,1-diphenyl-1,2,2,2-tetramethoxydisilane; a pentamethoxydisilane compound such as methylpentamethoxydisilane and phenylpentamethoxydisilane; hexamethoxydisilane; and compounds obtained by replacing a part or all of methoxy groups of the above compounds with other substituted or unsubstituted hydrocarbyloxy groups such as ethoxy, n-propoxy, isopropoxy, 2-methoxyethoxy and phenoxy.

These disilane compounds may be used singly or in combination of two or more.

As a part of the disilane compound, the disilane compound(s) of the formula (II) in which n is 5 may be used in combination. As the disilane compound which can be used in combination, there may be mentioned a monomethoxydisilane compound such as pentamethylmethoxydisilane and 1-phenyl-1,1,2,2-tetramethyl-2-methoxydisilane; and compounds obtained by replacing these methoxy groups with other substituted or unsubstituted hydrocarbyloxy groups.

The above disitane compound can be synthesized according to a known method such as hydrocarbyloxylation, for example, alkoxylation or aryloxylation of a halogenated disilane compound; introduction of an alkyl group or other organic group into a halogenated disilane compound or a substituted or unsubstituted hydrocarbyloxylated disilane compound by an organic metal reagent; or chlorination of an alkyl- or aryldisilane compound and hydrocarbyloxylation subsequent thereto, for example, alkoxylation or aryloxylation. For example, the reaction described in detail in "Shin Jikken Kagaku Koza", Vol. 12, Organic Metal Chemistry (published by Maruzen), pp. 331 to 377 (1976) may be used.

Among these starting disilane compounds, a chlorinated disilane can be obtained as a by-product of a direct synthesis method of an organochlorosilane as described above or a reaction product obtained by redistributing the by-product.

The characteristic feature of the present invention resides in that a reaction product of an organic alkali metal compound and a disilane compound and/or a silane compound both of which have substituted or unsubstituted hydrocarbyloxy groups is used as a catalyst for accelerating disproportionation in which a polyorganosilane is obtained from the above disilane compound, or as an organic group source for introducing various organic groups into the polyorganosilane depending on the case.

In the organic alkali metal compound RM, as the substituted or unsubstituted monovalent hydrocarbon group represented by R, there may be mentioned, for example, a straight or branched alkyl group such as methyl, ethyl, propyl, butyl, hexyl and octyl; a cycloalkyl group such as cyclohexyl; an aralkyl group such as benzyl, 2-phenylethyl, 2-phenylpropyl and 3-phenylpropyl; an aryl group such as phenyl, tolyl and mesityl; an alkenyl group such as vinyl, allyl, 3-butenyl and 6-hexenyl; a cycloalkenyl group such as a cyclopentenyl group; an alkenylaryl group such as 4-vinylphenyl and 4-(2-propenyl)phenyl; an arylalkenyl group such as styryl; an alkynyl group such as ethynyl and propynyl; and a substituted hydrocarbon group such as 3-chloropropyl, p-chlorophenyl, 3,3,3-trifluoropropyl and p-methoxyphenyl. From the point of availability, methyl, ethyl, butyl, phenyl and ethynyl are preferred. As the alkali metal represented by M, there may be mentioned lithium, sodium, potassium, rubidium and cesium. From the point of availability, lithium, sodium and potassium are preferred. As a specific example of the organic alkali metal compound described above, there may be mentioned methyl lithium, n-butyl lithium, t-butyl lithium, phenyl lithium, phenyl sodium, lithium acetylide and sodium acetylide.

The disilane compound and/or the silane compound to be used for synthesizing the disproportionation reaction catalyst is/are represented by the formula (VI):

(VI)

wherein $R^3$ and $R^4$ are the same or different and each represent a substituted or unsubstituted monovalent hydrocarbon group; a represents 1 or 2; and b represents an integer of $0 \leq b \leq 2a+1$.

When a is 2, the compound of the formula (VI) is a disilane compound and when a is 1, it is a silane compound. The disilane compounds and/or the silane compounds both of which have hydrocarbyloxy groups may be used singly or in combination of two or more. From the point of a reaction rate, b is preferably in the range of $0 \leq b \leq 2a$. Also, from the point of a reaction rate, it is preferred to use the disilane compound.

As $R^3$, there may be mentioned the same groups for $R^1$. From the same reason in the case of $R^1$, a methyl group is particularly preferred. As $R^4$, there may be mentioned the same groups for $R^2$. From the same reason in the case of $R^2$, a lower alkyl group and a phenyl group are preferred, and a methyl group and an ethyl group are more preferred.

As a specific example of the disilane compound described above, there may be mentioned the same compounds as the disilane compounds mentioned as a starting compound of disproportionation reaction, and further a monohydrocarbyloxydisilane compound such as pentamethylmethoxydisilane and pentamethylethoxydisilane may be used in preparation of the disproportionation reaction catalyst. The disilane compound to be used for preparing the catalyst may be the same as or different from the disilane compound to be used as a starting compound.

As a specific example of the silane compound, there may be mentioned a monomethoxysilane compound such as trimethylmethoxysilane, dimethylhexylmethoxysilane and dimethylphenylmethoxysilane; a dimethoxysilane compound such as dimethyldimethoxysilane, methylhexyldimethoxysilane, methylphenyldimethoxysilane and diphenyldimethoxysilane; a trimethoxysilane compound such as methyltrimethoxysilane, ethyltrimethoxysilane, propyltrimethoxysilane, butyltrimethoxysilane, pentyltrimethoxysilane, hexyltrimethoxysilane, octyltrimethoxysilane, cyclohexyltrimethoxysilane and phenyltrimethoxysilane; tetramethoxysilane; and compounds obtained by replacing a part or all of methoxy groups of the above compounds with other substituted or unsubstituted hydrocarbyloxy groups such as ethoxy, n-propoxy, isopropoxy, 2-methoxyethoxy and phenoxy.

The preparation of a catalyst mixture proceeds in a reactor in which humidity is intercepted, by adding the organic alkali metal compound RM (wherein R and M have the same meanings as described above) to the disilane compound and/or the silane compound described above to effect an exchange reaction of the alkali metal compound and a Si—$OR^4$ bond (wherein $R^4$ has the same meaning as described above) of the disilane compound and/or the silane compound, thereby forming the disilane compound and/or the silane compound partially having a Si—R bond, and $M^+(OR^4)^-$.

The amount of the organic alkali metal compound is preferably 0.2 to 1.4 equivalent, more preferably 0.6 to 1.0. equivalent per one substituted or unsubstituted hydrocarbyloxy group of the disilane compound and/or the silane compound to be used. If the amount is outside the above range, either the organic alkali metal compound or the disilane or silane compound is excessive and remains as such in the system of the catalyst disadvantageously.

In order to help the organic alkali metal compound to be dissolved in the disilane compound and/or the silane compound, control the reaction temperature or increase the reaction rate, a reaction solvent may be used, if necessary. As the reaction solvent, there may be mentioned a hydrocarbon type solvent such as toluene, xylene and hexane; an ether type solvent such as diethyl ether, tetrahydrofuran, 1,4-dioxane and diethylene glycol dimethyl ether; and an aprotic polar solvent such as dimethylformamide, dimethyl sulfoxide and hexamethylphosphoric triamide.

The reaction for preparing the catalyst can be carried out by mixing and stirring the starting compounds at −100° C. to 100° C., preferably 0° to 30° C. If the reaction temperature exceeds 100° C., the reaction is too violent or intense so that its control is difficult. Further, the organic alkali metal reagent may be decomposed because of high temperature brought about by heat generation.

The resulting catalyst mixture is a mixture of the disilane compound and/or the silane compound $R_cR^3_bSi_a(OR^4)_{2a+2-b-c}$ and $M^+(OR^4)^-$ obtained by the exchange reaction of R and $OR^4$, and unreacted $R^3_bSi_a(OR^4)_{2a+2-b}$ (in the above formulae, c represents a number of $1 \leq c \leq 5b$; and R, $R^3$, $R^4$, M, a and b have the same meanings as described above). The catalyst mixture thus prepared may be stored in a tightly closed container or may be used as such for the next disproportionation reaction.

The disproportionation reaction is carried out by adding the catalyst mixture prepared as described above to the disilane compound represented by the above formula (II) in a reactor in which humidity is intercepted. A series of the reactions from (i) preparation of the catalyst mixture to (2) synthesis of the polyorganosilane by the disproportionation reaction are schematically shown below.

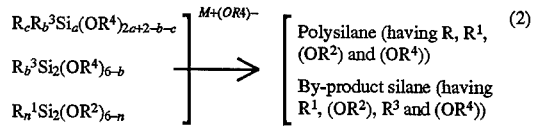

wherein R, $R^1$, $R^2$, $R^3$, $R^4$, M, n, a, b and c have the same meanings as described above.

As described above, in the reaction (1), the organic alkali metal compound is reacted with the equivalent amount of the hydrocarbyloxysilyl groups. Then, in the reaction (2), the starting disilane compound $R^1{}_n Si_2(OR^2)_{6-n}$ and the disilane components in the catalyst mixture, i.e., $R_c R^3{}_b Si_2(OR^4)_{6-b-c}$ and $R^3{}_b Si_2(OR^4)_{6-b}$, are subjected to the disproportionation reaction by the action of $M^+(OR^4)^-$ existing in the catalyst mixture. By the disproportionation reaction, the disilane bond is cut. One silane segment is bonded to M and the other silane segment is bonded to $OR^4$. The Si—M bond formed by this reaction attacks the other disilane compound or the polysilane compound produced, whereby the polysilane chain is grown. Thus, the organic group R of the organic alkali metal compound is introduced into the polysilane.

By such a mechanism, different kinds of the substituted or unsubstituted monovalent hydrocarbon groups can be introduced into the resulting polysilane by selecting R which is different from $R^1$ of the disilane compound to be used as a starting compound of the disproportionation reaction. Thus, when an organic group which is bonded to the disilane compound to elevate its boiling point or melting point so that its synthesis and purification operation are made complicated or an organic group which is unstable under high temperature for purification, for example, hexyl, benzyl, phenyl, tolyl, allyl, 6-hexenyl, ethynyl or p-methoxyphenyl, among organic groups bonded to a silicon atom is to be introduced to the polysilane, the preparation process of the present invention is a particularly effective method from the point that the above organic groups can be introduced from organic groups of the organic alkali metal compound.

The amount of the catalyst mixture in the disproportionation reaction is preferably 0.0001 to 0.5 equivalent calculated on the amount of the organic alkali metal compound used for preparing the catalyst mixture, per one substituted or unsubstituted hydrocarbyloxy group of the starting disilane compound and the disilane compound and/or the silane compound used for preparing the catalyst mixture. The amount is more preferably 0.001 to 0.1 equivalent in order to make the disproportionation reaction proceed efficiently. If the amount is less than 0.0001 equivalent, the rate of the disproportionation reaction is slow. If the amount exceeds 0.5 equivalent, not only it is difficult to remove the catalyst after the disproportionation reaction, but also cost is increased. In order to control the molecular weight of the desired polyorganosilane for imparting necessary physical properties thereto or control the rate of R to be introduced into the polyorganosilane, it is preferred to select the necessary amount and the kind of the organic alkali metal compound.

As described above, the disilane compound is used as a starting compound of the disproportionation reaction. Further, there may exist a silane compound represented by the formula (VII):

$$R^1{}_m Si(OR^2)_{4-m} \qquad (VII)$$

wherein m represents an integer of 0 to 2; and $R^1$ and $R^2$ have the same meanings as described above, i.e., the same silane compound used for preparing the catalyst provided that the number of the substituted or unsubstituted hydrocarbyloxy groups in a molecule is not 1. It has been found that the silane compound described above functions as a reaction solvent, and the reaction rate is extremely slow as compared with that of the disilane compound, but the silane compound is slightly introduced into the molecules of the polysilane compound obtained by the disproportionation reaction. However, the amount of the silane compound described above existing at a starting point of the disproportionation reaction should be equivalent moles or less based on the amount the disilane compound. If the amount exceeds equivalent moles, the disproportionation reaction rate as a whole system is made slower. Further, the silane compound described above is additionally produced accompanied with progress of the disproportionation reaction by the scheme (2) shown above.

In order to control the reaction rate of the disproportionation reaction or increase the activity of the catalyst, a reaction solvent may be used. As the reaction solvent, there may be mentioned the same reaction solvents as described above for the reaction for preparing the catalyst, or the reaction catalyst used in the reaction for preparing the catalyst may be used as such for the disproportionation reaction without removing it.

The reaction temperature of the disproportionation reaction is 10° to 170° C., preferably 15° to 130° C. If the temperature is lower than 10° C., the disproportionation reaction accompanied with cutting and forming a Si—Si bond proceeds extremely slowly, while if it exceeds 170° C., a side reaction is easily caused. Some of the silanes which are by-products of the reaction have relatively low boiling points so that in order to maintain the reaction temperature slightly higher, the reaction is carried out while removing low boiling point silanes which are by-products, if necessary.

The reaction is carried out preferably under environmental atmospheric pressure. However, if desired, a pressure higher or lower than the above pressure can be used suitably.

The polyorganosilane obtained by the reaction can be isolated by removing the silane compound which is a by-product, the catalyst and the like, and can be purified by reprecipitation, distillation or column chromatography, if necessary.

In another embodiment (second embodiment) of the present invention, the same starting material (the disilane compound (A)) of the formula (II) as mentioned above can be used. In this embodiment, n in the formula (II) is preferably 0 to 3.

As a part of the disilane compound (A), the disilane compound(s) of the formula (II) in which n is 4 and/or n is 5 may be used in combination.

In the present invention, the organic alkali metal compound (B) to be used for synthesizing the compound (D) as a catalyst of disproportionation reaction by reacting with the compound (A) and also to be used for introducing the central organic portion $R^3$ of the bis(disilyl) compound (C) to be used as a starting compound of disproportionation reaction is represented by the formula (III):

$$MR^3{}_p M \qquad (III)$$

wherein $R^3$, M and p have the same meanings as described above.

As the divalent organic group of $R^3$, there may be mentioned a divalent saturated hydrocarbon group such as methylene, ethylene, trimethylene, tetramethylene and hexamethylene; a divalent saturated alicyclic hydrocarbon group such as 1,4-cyclohexylene; a divalent conjugated or non-conjugated unsaturated aliphatic hydrocarbon group such as vinylene, 1,3-propenylene, 1,4-butenylene, ethynylene, 1,3-butadien-1,4-diyl, 1,3,5-hexatrien-1,6-diyl and 1,3,5,7-octatetraen-1,8-dinyl; a divalent conjugated or non-conjugated unsaturated alicyclic hydrocarbon group such as 2,3-, 1,4- or 2,4-cyclopentadien-1,3-diyl; a divalent aromatic hydrocarbon group such as phenylene, biphenylene, naphthalendiyl, 4,4'-methytenediphenylene and 4,4'-(dimethylmethylene)diphenylene; and a divalent heterocyclic group such as furan-2,5-diyl, furan-3,4-diyl, thiophen-2,5-diyl, thiophen-3,4-diyl, pyrrol-3,4-diyl, pyridin-2,3-diyl, pyridin-2,4-diyl and pyridin-2,5-diyl. There may be also used a divalent group in which two $R^3$s, for example, two phenylene groups are bonded through an ether oxygen atom as a 4,4'-oxydiphenylene group. Among these groups, from the point of easiness of synthesis, a divalent aromatic hydrocarbon group and a divalent heterocyclic group are preferred, and a divalent heterocyclic group is particularly preferred. p is a number of 1 or more, and from the point of easiness of synthesis, p is preferably 1 or 2, most preferably 1.

M is an alkali metal atom. As M, there may be mentioned lithium, sodium, potassium, rubidium and cesium. From the points of easiness of synthesis and availability, lithium, sodium and potassium are preferred, and lithium is most preferred.

As a specific example of the organic alkali metal compound (B) described above, there may be mentioned a saturated aliphatic dilithio compound such as 1,2-dilithioethane, 1,3-dilithiopropane, 1,4-dilithiobutane and 1,6-dilithiohexane; a non-conjugated unsaturated dilithio compound such as 1,2-dilithioethenylene, 1,3-dilithiopropenylene, 1,3-dilithiobutenylene and 1,2-dilithioethynylene; a conjugated unsaturated dilithio compound such as 1,4-dilithio-1,3-butadiene, 1,6-dilithio-1,3,5-hexatriene and 1,8-dilithio-1,3,5,7-octatetraene; a saturated alicyclic dilithio compound such as 1,4-dilithiocyclohexane; an unsaturated alicyclic dilithio compound such as 1,2- or 1,3-dilithiocyclopentadiene; a dilithiobenzene such as 1,4-dilithiobenzene, 1,3-dilithiobenzene and 1,2-dilithiobenzene; a dilithiobiphenylene such as 4,4'-dilithiobiphenylene, 1,1'-dilithiobiphenylene, 2,2'-dilithiobiphenylene and 3,3'-dilithiobiphenylene; a dilithio compound having other aromatic ring such as 2,7-dilithionaphthalene, bis(4-lithiophenyl)methane, 2,2-bis(4-lithiophenyl)propane and bis(4-lithiophenyl)ether; a dilithiofuran such as 2,5-dilithiofuran and 3,4-dilithiofuran; a dilithiothiophene such as 2,5-dilithiothiophene and 3,4-dilithiothiophene; a dilithiopyrrole such as 3,4-dilithiopyrrole; a dilithiopyridine such as 2,3-dilithiopyridine, 2,4-dilithiopyridine and 2,5-dilithiopyridine; and a sodium compound, a potassium compound and a rubidium compound corresponding thereto. As described above, a lithium compound, a sodium compound and a potassium compound are preferred, and a lithium compound is most preferred.

The amount of the compound (B) is not particularly limited and may be 0.001 to 50 mole % based on the amount of the disitane compound (A) to be used. If the amount of the compound (B) is too small, the reaction proceeds extremely slowly. If the amount is too large, not only it is difficult to remove a catalyst after the reaction, but also cost is increased. The amount of the compound (B) is preferably 0.1 to 30 mole % based on the amount of the disilane compound (A).

The preparation process of the present invention is carried out substantially under anhydrous conditions since all of the starting disilane compound (A) and organic alkali metal compound (B) and the resulting bis(disilyl) compound (C) and alkali metal hydrocarbyloxide (D) are easily hydrolyzed.

The first reaction of the present invention, i.e., preparation of a mixture containing a catalyst is carried out in a reactor in which humidity is intercepted, by adding the disilane compound (A) described above to the organic alkali metal compound (B). The compounds (A) and (B) may be mixed according to any desired method, but it is preferred that one of the compounds (A) and (B) is slowly added dropwise to the other in order not to proceed the reaction abruptly.

In order to help the organic alkali metal compound (B) to be dissolved in the disilane compound (A), control the reaction temperature or increase the reaction rate, a reaction solvent may be used, if necessary. As the reaction solvent, there may be mentioned a hydrocarbon type solvent such as toluene, xylene, n-hexane, n-heptane and cyclohexane; an ether type solvent such as diethyl ether, tetrahydrofuran, 1,4-dioxane, ethylene glycol dimethyl ether, ethylene glycol diethyl ether and diethylene glycol dimethyl ether; and an aprotic polar solvent such as dimethylformamide, dimethyl sulfoxide and hexamethylphosphoric triamide.

The first reaction can be carried out generally by mixing and stirring the starting compounds at $-100°$ C. to $100°$ C., preferably $-80°$ to $30°$ C. If the reaction temperature exceeds $100°$ C., the reaction is too violent or intense so that its control is difficult. Further, the organic alkali metal reagent may be decomposed because of high temperature brought about by heat generation.

By the first reaction, a Si—$OR^2$ bond (wherein $R^2$ has the same meaning as described above) of a part of the disilane compound (A) is exchanged with two M—$R^3$ bonds (wherein M and $R^3$ have the same meanings as described above) of the organic alkali metal compound (B) to produce the bis(disilyl) compound (C) having a divalent organic group $R^3$ introduced from the compound (B) and the Si—$OR^2$ bond derived from the compound (A) in a molecule, and the alkali metal hydrocarbyloxide (D) $MOR^2$. The resulting reaction product is a mixture containing not only the compound (D) which is produced by the first reaction and functions as a catalyst of disproportionation reaction, but also the remaining compound (A) and the compound (C) produced. The mixture can be used as such for disproportionation reaction which is the second reaction. When a reaction solvent exists, the reaction solvent may be used as such as a reaction solvent of the disproportionation reaction. Depending on the kind of a desired silicon-containing polymer and reaction conditions, the second reaction may be carried out by further adding the disilane compound (A) and/or a reaction solvent. However, in the present invention, it is preferred that the reaction product obtained by the first reaction is used as such for the disproportionation reaction for handling and rational practice of the process.

The reaction temperature of the second reaction can be set optionally depending on the kind of the starting disilane compound (A), a reaction solvent, a catalyst amount and the molecular weight of a desired silicon-containing polymer, but it is generally $10°$ to $250°$ C., preferably $20°$ to $100°$ C. If the temperature is lower than $10°$ C., the rate of the disproportionation reaction accompanied with cutting and producing the Si—Si bond is extremely slow, while if it exceeds 250° C., a side reaction is easily caused. Some of the silanes which are by-products of the reaction have relatively low boiling points so that in order to maintain the reaction temperature slightly higher, the reaction is carried out while removing low boiling point silanes which are by-products, if necessary.

The reaction is carried out preferably under environmental atmospheric pressure. However, if desired, a pressure higher or lower than the above pressure can be used suitably.

The silicon-containing polymer obtained by the reaction can be isolated by removing an alkoxy silane compound which is a by-product, the catalyst and the like, and can be purified by reprecipitation, distillation or column chromatography, if necessary.

The silicon-containing polymer synthesized by the process of the present invention as described above is represented by the formula (VIII):

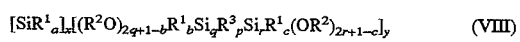

$$[SiR^1{}_aL_l(R^2O)_{2q+1-b}R^1{}_bSi_qR^3{}_pSi_rR^1{}_c(OR^2)_{2r+1-c}]_y \quad (VIII)$$

wherein a represents 0, 1 or 2; q and r each independently represent 1 or 2; b and c each represent an integer of $0 \leq b < 3$ and $0 \leq c < 3$; x and y are polymerization degree of the respective recurring units and positive integers, x is 2 or more and x>y; and $R^1$, $R^2$, $R^3$ and p have the same meanings as described above.

The silicon-containing polymer is easily soluble in an aromatic hydrocarbon type solvent such as toluene, benzene and xylene; a halide solvent such as dichloromethane, dichloroethane, chloroform and carbon tetrachloride; and an ether type solvent such as tetrahydrofuran and dioxane. The solubility of the silicon-containing polymer in a solvent can be achieved by lowering a crosslinking degree and/or selecting the amount of the organic group represented by $R^3$ to be introduced and the kind of $R^3$. Also, the solubility of the resulting polymer varies depending on the kind of the organic groups in the disilane compound (A) and the organic alkali metal compound (B) used for synthesis, the reaction temperature and the reaction conditions. There is a tendency that as the reaction temperature is higher or the number of hydrocarbyloxy groups in the starting silane compound (A) is larger, the crosslinking degree of the silicon-containing polymer is increased and the solubility thereof is decreased.

According to the process of the present invention, a polyorganosilane or a silicon-containing polymer can be synthesized efficiently by preparing a catalyst for disproportionation reaction having high activity by a simple operation and using the catalyst. Further, various substituents can be introduced into a polyorganosilane at a desired ratio by selecting the amount and the kind of an organic alkali metal compound. In particular, substituents which are difficult to be introduced from a disilane compound can be introduced into a polyorganosilane effectively. Further, it is possible to control the molecular weight of a polyorganosilane. Moreover, a silicon-containing polymer having optional organic groups in a branched or network molecular skeleton and comprising a polysilane bond can be synthesized by optionally selecting one or more substituents in a molecule of the disilane compound to be used as a starting compound and one or more divalent organic groups in a molecule of the organic alkali metal compound. Particularly when such a silicon-containing polymer is used for forming a circuit in which conductivity and photolysis are used, said polymer is stable because of its branched or network Si—Si skeleton, and even when the Si—Si bond is cut, the molecular weight is not abruptly lowered thereby. Particularly by introducing divalent organic groups into the molecular skeleton, the solubility of the polymer in an organic solvent is improved although it has a network structure, whereby the polymer can be handled easily.

According to the process of the present invention, a silicon-containing polymer having a branched or network polysilane structure and a crosslinked structure by divalent organic groups in its molecular skeleton can be obtained easily. Such a silicon-containing polymer having a branched or network polysilane structure has excellent conductivity and heat resistance. Therefore, the polyorganosilane or the silicon-containing polymer obtained by the process of the present invention is useful as an organic conductive material, a non-linear optical material, a photolysis type reaction initiator, a precursor of silicon carbide type ceramics, a photoresist material and intermediates thereof.

The silicon-containing polymer having a silicon functional group such as an alkoxyl group and/or a carbon functional group such as an aliphatic unsaturated group in a molecule can be further increased in the molecular weight according to a known method by using said polymer as a prepolymer.

EXAMPLES

The present invention is described in detail by referring to Examples, but the scope of the present invention is not limited thereby. In the following Examples, "part" means "part by weight", Me represents a methyl group, Et represents an ethyl group, Bu represents a butyl group and Ph represents a phenyl group.

Example 1

Under dry argon gas stream, 0.22 part of 1,2-dimethyl-1,1,2,2-tetraethoxydisilane was charged into a flask having a stirrer and a simple distillator, and 0.5 part of a 1.14 N anhydrous diethyl ether solution containing methyl lithium was added thereto by a syringe. The mixture was reacted by stirring at 20° C. for 1 hour to prepare a pale yellow liquid catalyst. During the reaction, formation of solids was not observed. Under dry argon gas stream, 10.38 parts of 1,2-dimethyl-1,1,2,2-tetraethoxydisilane was added to the catalyst, and the mixture was stirred while heating gradually. The temperature of the mixture was elevated to 100° C. while removing low boiling point compounds, and stirring was continued for 10 hours to obtain a brown liquid product. While heating was continued, 0.5 part of a distillate was obtained in a receiver of the simple distillator. The amount of methyl lithium used corresponded to 2 mole % based on the total amount of the disilane compounds used for preparing the catalyst and used as a starting compound and corresponded to 0.5 mole % based on the amount of the ethoxy groups of the disilane compounds.

When the product in the flask was applied to gas chromatography using SE30 (trade name, produced by General Electric Co.) as a solid phase, it was confirmed that the peak of the starting disilane compound disappeared. Subsequently, solids were removed by suction filtration, and the filtrate was slowly added dropwise to anhydrous ethanol to effect reprecipitation. The resulting solid product was dried under vacuum. The yield was 0.67 part. As to the product, $^1$HNMR and IR absorption spectrum were measured. The results are shown below. Further, by gel permeation chromatography (GPC), a weight average molecular weight calculated on polystyrene and a molecular distribution coefficient (Mw/Mn) were measured. The results are shown in Table 1.

$^1$H-NMR (60 MHz, CDCl$_3$, δ): 3.4 to 4.1 (m, —OCH$_2$C, 2H), 1.0 to 1.5 (m, —OCCH$_3$, 3H), −0.1 to 0.9 (s, Si—Me$_3$, 12H)

IR (KBr): 2965, 1631, 1270, 1103, 1035 cm$^{-1}$

The product was dissolved in tetrahydrofuran to prepare a $1.0 \times 10^{-3}$% by weight solution, and its UV absorption spectrum was measured. The resulting UV absorption chart is shown in FIG. 1. From the results, it was confirmed that the resulting solid product was a polysilane having a methyl group and an ethoxy group.

Comparative Example 1

Under argon gas atmosphere at 25° C., 0.46 part of anhydrous ethanol and 0.5 part of an ether solution (1.14 N) containing methyl lithium were mixed in a flask, the mixture was stirred for 1 hour, and excessive low boiling point compounds such as ethanol were completely removed under reduced pressure (2 Torr) over 2 hours. The flask was charged with 10.6 parts of 1,2-dimethyl-1,1,2,2-tetraethoxydisilane and 0.5 part of anhydrous diethyl ether. When the mixture was stirred at room temperature, two hours were required until the solid catalyst was dissolved completely. The mixture was heated to 100° C. while stirring and stirring was continued for 10 hours. Thereafter, the resulting product was applied to gas chromatography (solid phase: SE30) to find that the peak of the starting disilane compound remained. Until the peak disappeared completely, heating and stirring for 8 hours were required. Subsequently, post-treatment of the reaction was carried out in the same manner as in Example 1 to obtain a polymethylsilane as a white solid. The yield was 0.51 part. The weight average molecular weight by GPC was 12,000.

From the above results, it can be seen that it is complicated to prepare a catalyst from ethanol and an organic lithium reagent and then carry out disproportionation reaction, and the catalyst has low activity.

Comparative Example 2

A catalyst was prepared in the same manner as in Comparative example 1, and excessive low boiling point compounds such as ethanol were removed. When the residue was left to stand as such at room temperature for 3 days, a white solid obtained during that period was changed to brown. In the same manner as in Comparative example 1, 1,2-dimethyl-1,1,2,2-tetraethoxydisilane and anhydrous diethyl ether were added to the solid, and the mixture was stirred at room temperature. However, the solid was not dissolved completely even after 12 hours. The reaction mixture was heated to 100° C. while stirring and stirring was continued. When the reaction was followed by gas chromatography (filler: SE30), it was confirmed that 40 hours were required until the peak of the starting disilane compound disappeared. Subsequently, post-treatment of the reaction was carried out in the same manner as in Example 1 to obtain a polymethylsilane as a white solid. The yield was 0.40 part. The weight average molecular weight by GPC was 6,700.

From the above results, it can be seen that a lithium alkoxide catalyst has poor storage stability and the activity of the catalyst was lowered by storage.

Comparative Example 3

For the purpose of examining influence on disproportionation by the presence of alcohol, under the same conditions as in Comparative example 1, 4.6 parts of anhydrous ethanol and 0.5 part of an anhydrous diethyl ether solution (1.14 N) containing methyl lithium were mixed in a flask, and the mixture was stirred for 1 hour. Subsequently, without removing low boiling point compounds such as ethanol, the flask was charged with 10.6 parts of 1,2-dimethyl-1,1,2,2-tetraethoxydisilane, and the mixture was stirred while heating at 70° C. for 10 hours. When the reaction mixture was applied to gas chromatography (filler: SE30), it was confirmed that the peak of the starting disilane compound disappeared. However, it was found that no polymethylsilane was produced, and the disilane compound was merely cut and converted into methyltriethoxysilane.

From the above results, it can be seen that in this catalyst system, the presence of alcohol inhibits production of a polyorganosilane during disproportionation reaction.

Examples 2 to 4

In the same manner as in Example 1, change of the average molecular weight of the resulting polysilanes was examined by changing the amount of methyl lithium to be used as a reaction starting compound. The results including those of Example 1 and the yields and properties of the products are shown in Table 1. In Example 4, after the disilane compound and methyl lithium were reacted, the reaction mixture was applied to gas chromatography before heating to confirm that 1,1,2-trimethyl-1,2,2-triethoxydisilane and 1,1,2,2-tetramethyl-1,2-diethoxydisilane were produced. From the reaction mixture of Example 4, no solid was obtained by reprecipitation so that low boiling point compounds were removed under conditions of 180° C. and 1 Torr to give a final product.

TABLE 1

| | Charged amounts (part) | | | | Product | | | |
|---|---|---|---|---|---|---|---|---|
| | | (EtO)$_2$MeSiSiMe (OEt)$_2$ | | | | | | |
| Example No. | MeLi | Preparation of catalyst | Starting compound | MeLi/OEt*[1] (mole/mole) | Yield (part) | State | Mw*[2] | Mw/Mn*[3] |
| 1 | 0.5 | 0.22 | 10.38 | 0.005 | 0.67 | White solid | 12,800 | 3.5 |
| 2 | 1.0 | 0.43 | 10.17 | 0.010 | 0.65 | White solid | 8,700 | 2.5 |
| 3 | 2.5 | 1.07 | 7.53 | 0.025 | 0.56 | White solid | 3,500 | 1.2 |
| 4 | 3.8 | 1.60 | 9.00 | 0.038 | 2.25 | Brown oily product | 1,200 | 1.2 |

(Notes)
*[1]: OEt means all ethoxy groups of disilane compounds used for preparing a catalyst and used as a starting compound.
*[2]: weight average molecular weight calculated on polystyrene by GPC
*[3]: GPC (gel permeation chromatography)

From the results in Table 1, it can be seen that the molecular weight of the resulting polymethylsilane can be controlled by changing the amount of methyl lithium to be used based on the amount of ethoxy groups of disilane compounds used as a reaction starting compound and used in a catalyst.

Examples 5 to 8

Preparation of a catalyst and disproportionation reaction were carried out in the same manner as in Example 1 except for using a 1.55 N hexane solution containing n-butyl lithium in an amount shown in Table 2 (Examples 5 and 6), a 1.54 N pentane solution containing t-butyl lithium in an amount shown in Table 2 (Example 7) or a 1.8 N cyclohexane solution containing phenyl lithium in an amount shown in Table 2 (Example 8) in place of the diethyl ether solution of methyl lithium to obtain a white solid, respectively. $^1$HNMR of these products was measured to obtain the results shown below.

Examples 5 and 6

$^1$H-NMR (60 MHz, CDCl$_3$, δ): 3.5 to 4.0 (m, —OCH$_2$C), 1.0 to 1.5 (m, —OCCH$_3$) , –0.1 to 1.5 (m, Si—Me and Bu)

Example 7

$^1$H-NMR (60 MHz, CDCl$_3$, δ): 3.5 to 4.0 (m, —OCH$_2$C), 1.0 to 1.5 (m, —OCCH$_3$) , –0.1 to 0.8 (m, Si—Me)

Example 8

$^1$H-NMR (60 MHz, CDCl$_3$, δ): 6.6 to 7.4 (m, Ph), 3.5 to 4.0 (m, —OCH$_2$C), 1.0 to 1.5 (m, —OCCH$_3$), –0.1 to 0.8 (m, Si—Me)

From these $^1$HNMR data, it was confirmed that each product was a polysilane having a methyl group, an ethoxy group and R of the organic metal compound used. The R/Me/OEt ratios obtained from signal intensity ratios of $^1$HNMR, yields and properties of the products and also the weight average molecular weights and weight average distribution coefficients obtained in the same manner as in Example 1 are shown in Table 2. In Examples 5 and 6, the signals of Si—Me and the butyl group were not separated sufficiently so that existence of the butyl group could be confirmed, but its ratio could not be measured.

Example 10

A catalyst was prepared in the same manner as in Example 1 except for using 3.8 parts of 1,1,2-trimethyl-1,2,2-triethoxydisilane as a disilane compound and using 10.6 parts of a 1.8 N cyclohexane solution containing phenyl lithium as an organic metal compound. To the catalyst was added 6.3 parts of 1,2-dimethyl-1,1,2,2-tetraethoxydisilane, and the mixture was stirred while heating in the same manner as in Example 9. As a result of the reaction, 0.25 part of a white solid having a weight average molecular weight calculated on polystyrene of 2,100 and a molecular weight distribution coefficient of 1.3 was obtained. Its $^1$H-NMR data are shown below.

$^1$H-NMR (60 MHz, CDCl$_3$, δ): 6.6 to 7.4 (m, Ph, 1H), 3.5 to 4.0 (m, —OCH$_2$C, 2H), 1.0 to 1.5 (m, —OCCH$_3$, $_3$H), –0.1 to 0.8 (m, Si—Me, 10H)

Example 11

Under dry argon gas stream, 450 parts of 1,4-dibromobenzene was charged into a flask having a cooling tube and a Y-tube, 13.3 parts of tetrahydrofuran was added thereto, and the mixture was stirred. The mixture was cooled to –78° C. by dry ice-acetone, and 989 parts of a 2.5 N n-hexane solution containing n-butyl lithium was added dropwise to the mixture. After disappearance of 1,4-dibromobenzene was confirmed by gas chromatography, 5,000 parts of 1,2-dimethyl-1,1,2,2-tetraethoxydisilane was slowly added drop-wise to the mixture. Thus, by the reaction of 1,4-dilithiobenzene and the disitane compound, lithium ethoxide was produced and at the same time, a part of the disilane compound was converted into 1,4-bis(1,2-dimethyl-1,2,2-triethoxydisilyl)benzene to obtain a mixture of these

TABLE 2

| Example No. | Charged amounts (parts) | | | RM/OEt*$^1$ | | Product | | | |
|---|---|---|---|---|---|---|---|---|---|
| | Kind of RM | RM | (EtO)$_2$MeSiSiMe(OEt)$_2$ | | Yield (part) | State | MW*$^2$ | Mw/Mn*$^3$ | R/Me/OEt*$^4$ |
| | | | Preparation of catalyst | Starting compound | (mole/ mole) | | | | |
| 5 | n-BuLi | 1.8 | 0.17 | 9.53 | 0.025 | 0.72 | White soid | 2,100 | 1.3 | *5 |
| 6 | n-BuLi | 7.0 | 4.25 | 6.34 | 0.10 | 0.60 | White soid | 2,000 | 1.5 | *5 |
| 7 | t-BuLi | 3.4 | 2.13 | 8.47 | 0.05 | 0.61 | White soid | 2,200 | 1.3 | 0.2/2/1 |
| 8 | PhLi | 3.6 | 2.13 | 8.47 | 0.05 | 0.70 | White soid | 2,500 | 1.5 | 0.2/1.7/1 |

(Notes)
*$^1$ to *$^3$: the same as in Table 1
*$^4$: from $^1$H-NMR
*5: invaluable Example 9

A catalyst was prepared in the same manner as in Example 1 except for using 0.2 part of tetraethoxysilane in place of the disilane compound and 0.4 part of a 1.55 N hexane solution containing n-butyl lithium in place of diethyl ether of methyl lithium. To the catalyst was added 10.6 parts of 1,2-dimethyl-1,1,2,2-tetraethoxydisilane, and the mixture was stirred while heating gradually. The temperature of the mixture was elevated to 100° C. while removing low boiling point compounds and stirring while heating was continued for 10 hours. As a result of the reaction, 0.70 part of a white solid having a weight average molecular weight calculated on polystyrene of 11,600 and a molecular weight distribution coefficient of 3.0 was obtained. The results of $^1$H-NMR and IR showed that the white solid was substantially the same polysilane obtained in Example 1, but existence of a small amount of the butyl group was also observed.

reaction products, unreacted 1,2-dimethyl-1,1,2,2-tetraethoxydisilane and n-hexane which was a reaction solvent. The mixture was heated as such at 100° C. for 20 hours to effect disproportionation reaction and then cooled to room temperature to obtain a reaction product.

When the reaction mixture in the flask was applied to gas chromatography using SE30 (trade name, produced by General Electric Co.) as a solid phase, the peak of the starting disilane compound disappeared and the peak of methyltriethoxysilane was observed. Anhydrous ethanol was slowly added to the mixture to obtain white precipitates. Lithium ethoxide was removed by suction filtration, and the solvent and methyltriethoxysilane which was a by-product were removed to obtain 640 parts of a polymer.

When the resulting polymer was applied to gel permeation chromatography, the weight average molecular weight (Mw) was 4,000 (calculated on polystyrene) and the Mw/Mn ratio was 1.89. Further, when $^1$H-NMR (CDCl$_3$, δ) was measured, the following signal was observed.

$^1$H-NMR (CDCl$_3$, δ): 0.40 (br. s, 94H, SiMe), 1.20 (t, J=7 Hz, 30H, SiOEt), 3.70 (q, J=7 Hz, 20H, SiOEt), 7.70 (m, 9H, —C$_6$H$_4$—)

From the results of the analysis by $^1$H-NMR, it was confirmed that the polymer was a polysilane having a phenylene group and a network structure with phenylene:OEt:Me=7:18:75.

Example 12

In the same manner as in Example 1 except for using 590 parts of 4,4'-dibromobiphenyl in place of 1,4-dibromobenzene, synthesis of 4,4'-dilithiobiphenyl and synthesis of a mixture containing a catalyst were carried out, then disproportionation reaction was carried out by using the resulting mixture as such and the resulting reaction product was purified to obtain 600 parts of a polymer.

When the resulting polymer was applied to gel permeation chromatography in the same manner as in Example 11, the polymer was bimodal. The respective weight average molecular weights were 76,000 and 11,000 and the Mw/Mn ratios were 1.24 and 3.15. From $^1$H-NMR (CDCl$_3$, δ) of the polymer, the following signal was observed.

$^1$H-NMR (CDCl$_3$, δ): 0.50 (br. s, 61H, SiMe), 1.30 (m, 9H, SiOEt), 3.80 (m, 6H, SiOEt), 7.80 (br. s, 11H, —C$_6$H$_4$—C$_6$H$_4$—)

From the results of the analysis by $^1$H-NMR, it was confirmed that the polymer was a polysilane having a biphenylene group and a network structure with biphenylene:OEt:Me=6:14:80.

Example 13

In the same manner as in Example 11 except for using 230 parts of 2,5-dibromothiophene in place of 1,4-dibromobenzene, synthesis of 2,5-dilithiothiophene and synthesis of a mixture containing a catalyst were carried out, then disproportionation reaction was carried out by using the resulting mixture as such and the resulting reaction product was purified to obtain 240 parts of a polymer.

When the resulting polymer was applied to gel permeation chromatography in the same manner as in Example 11, the polymer was bimodal. The respective weight average molecular weights were 79,000 and 11,600 and the Mw/Mn ratios were 1.3 and 2.2. From $^1$H-NMR (CDCl$_3$, δ) of the polymer, the following signal was observed.

$^1$H-NMR (CDCl$_3$, δ): 0.40 (br. s, 82H, SiMe), 1.20 (m, 7H, SiOEt), 3.50 (m, 7H, SiOEt), 7.0 to 7.70 (m, 1H, —C$_5$H$_2$S—)

From the results of the analysis by $^1$H-NMR, it was confirmed that the polymer was a polysilane having a thiophene ring and a network structure with a thiophene ring:OEt:Me=2:13:85.

We claim:

1. A process for preparing a polyorganosilane which comprises subjecting a disilane compound having at least two substituted or unsubstituted hydrocarbyloxy groups in one molecule to disproportionation reaction in the presence of a catalyst comprising a reaction product of an organic alkali metal compound represented by the formula (I):

RM     (I)

wherein R represents a substituted or unsubstituted monovalent hydrocarbon group; and M represents an alkali metal, and at least one of a disilane compound or a silane compound both of which have one or more substituted or unsubstituted hydrocarbyloxy groups.

2. The process according to claim 1, wherein the disilane compound to be subjected to disproportionation reaction is represented by the formula (II):

$R^1_n Si_2(OR^2)_{6-n}$     (II)

wherein R$^1$ and R$^2$ are the same or different and each represent a substituted or unsubstituted monovalent hydrocarbon group; and n represents an integer of 0 to 4.

3. The process according to claim 1, wherein the disilane compound or the silane compound to be reacted with the organic alkali metal compound is represented by the formula (VI):

$R^3_b Si_a(OR^4)_{2a+2-b}$     (VI)

wherein R$^3$ and R$^4$ are the same or different and each represent a substituted or unsubstituted monovalent hydrocarbon group; a represents 1 or 2; and b represents an integer of 0≦b≦2a+1.

4. The process according to claim 2, wherein R is a substituted or unsubstituted monovalent hydrocarbon group which is different from R$^1$.

5. The process according to claim 1, wherein the disproportionation reaction is carried out at a temperature of 10° to 170° C.

6. The process according to claim 5, wherein the disproportionation reaction is carried out at a temperature of 15° to 130° C.

7. A process for preparing a silicon-containing polymer having a branched or network structure, which comprises the steps of:

(1) reacting a disilane compound (A) having hydrocarbyloxy groups represented by the formula (II):

$R^1_n Si_2(OR^2)_{6-n}$     (II)

wherein R$^1$ and R$^2$ are the same or different and each independently represent a substituted or unsubstituted monovalent hydrocarbon group; and n represents an integer of 0 to 3, with an organic alkali metal compound (B) represented by the formula (III):

$MR^3_p M$     (III)

wherein R$^3$ represents a saturated or unsaturated chain divalent hydrocarbon group, a cyclic divalent hydrocarbon group or a divalent heterocyclic group, two or more R$^3$s may be the same or different and an ether oxygen atom may exist between two or more R$^3$s; p represents an integer of 1 or more; and M represents an alkali metal atom, to synthesize a bis(disilyl) compound (C) having hydrocarbyloxy groups represented by the formula (IV):

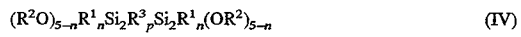
$(R^2O)_{5-n}R^1_n Si_2 R^3_p Si_2 R^1_n(OR^2)_{5-n}$     (IV)

wherein R$^1$, R$^2$, R$^3$, n and p have the same meanings as defined above, and an alkali metal hydrocarbyloxide (D) represented by the formula (V):

$MOR^2$     (V)

wherein R$^2$ and M have the same meanings as defined above, from a part of the compound (A); and (2) subjecting the compound (C) in the resulting mixture and the remaining compound (A) to disproportionation reaction.

8. The process according to claim 7, wherein the reaction of the disilane compound (A) and the organic alkali metal compound (B) is carried out at a temperature of −100° C. to 100° C.

9. The process according to claim 8, wherein the reaction of the disilane compound (A) and the organic alkali metal compound (B) is carried out at a temperature of −80° C. to 30° C.

10. The process according to claim 7, wherein the disproportionation reaction in the step (2) is carried out at a temperature of 10° C. to 250° C.

11. The process according to claim 10, wherein the disproportionation reaction in the step (2) is carried out at a temperature of 20° C. to 100° C.

12. The process according to claim 7, wherein the organic alkali metal compound (B) is at least one selected from the group consisting of 1,2-dilithioethane, 1,3-dilithiopropane, 1,4-dilithiobutane, 1,6-dilithiohexane, 1,2-dilithioethenylene, 1,3-dilithiopropenylene, 1,3-dilithiobutenylene, 1,2-dilithioethynylene, 1,4-dilithio-1,3-butadiene, 1,6-dilithio-1,3,5-hexatriene, 1,8-dilithio-1,3,5,7-octatetraene, 1,4-dilithiocyclohexane, 1,2- or 1,3-dilithiocyclopentadiene; 1,4-dilithiobenzene, 1,3-dilithiobenzene, 1,2-dilithiobenzene, 4,4'-dilithiobiphenylene, 1,1'-dilithiobiphenylene, 2,2'-dilithiobiphenylene, 3,3'-dilithiobiphenylene, 2,7-dilithionaphthalene, bis(4-lithiophenyl)methane, 2,2-bis(4-lithiophenyl)propane, bis(4-lithiophenyl)ether, 2,5-dilithiofuran, 3,4-dilithiofuran, 2,5-dilithiothiophene, 3,4-dilithiothiophene; a dilithiopyrrole, 2,3-dilithiopyridine, 2,4-dilithiopyridine, 2,5-dilithiopyridine, and a compound wherein the lithium atom of the above compounds is replaced by a sodium atom, a potassium atom, or a rubidium atom.

13. The process according to claim 7, wherein the resulting silicon-containing polymer is represented by the formula:

$$[SiR^1{}_a]_x[(R^2O)_{2q+1-b}R^1{}_bSi_qR^3{}_pSi_rR^1{}_c(OR^2)_{2r+1-c}]_y \qquad \text{(VIII)}$$

wherein a represents 0, 1 or 2; q and r each independently represent 1 or 2; b and c each represent an integer of $0 \leq b < 3$ and $0 \leq c < 3$; x and y are polymerization degree of the respective recurring units and positive integers, x is 2 or more and x>y.

14. The process according to claim 7, wherein the saturated chain divalent hydrocarbon group of $R^3$ is methylene, ethylene, trimethylene, tetramethylene or hexamethylene, the unsaturated chain divalent hydrocarbon group of $R^3$ is vinylene, 1,3-propenylene, 1,4-butenylene, ethynylene, 1,3-butadien-1,4-diyl, 1,3,5-hexatrien-1,6-diyl or 1,3,5,7-octatetraen-1,8-dinyl, the cyclic divalent hydrocarbon group of $R^3$ is 2,3-, 1,4-, or 2,4-cyclopentadien-1,3-diyl, phenylene, biphenylene, naphthalendiyl, 4,4'-methylenediphenylene or 4,4'-(dimethylmethylene) diphenylene and the divalent heterocyclic group of $R^3$ is furan-2,5-diyl, furan-3,4-diyl, thiophen-2,5-diyl, thiophen-3,4-diyl, pyrrol-3,4-diyl, pyridin-2,3-diyl, pyridin-2,4-diyl or pyridin-2,5-diyl.

* * * * *